April 2, 1935.                J. W. FORRESTER                1,996,509
LOGGING EQUIPMENT HANGING DEVICE
Filed Feb. 17, 1934                    2 Sheets-Sheet 1
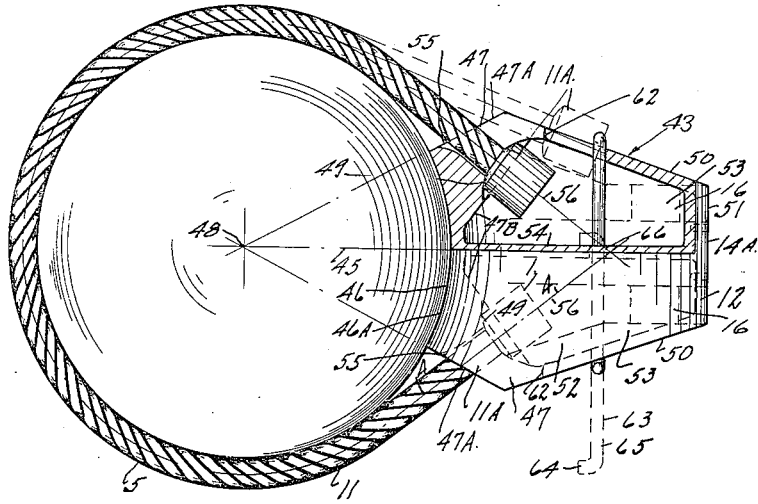
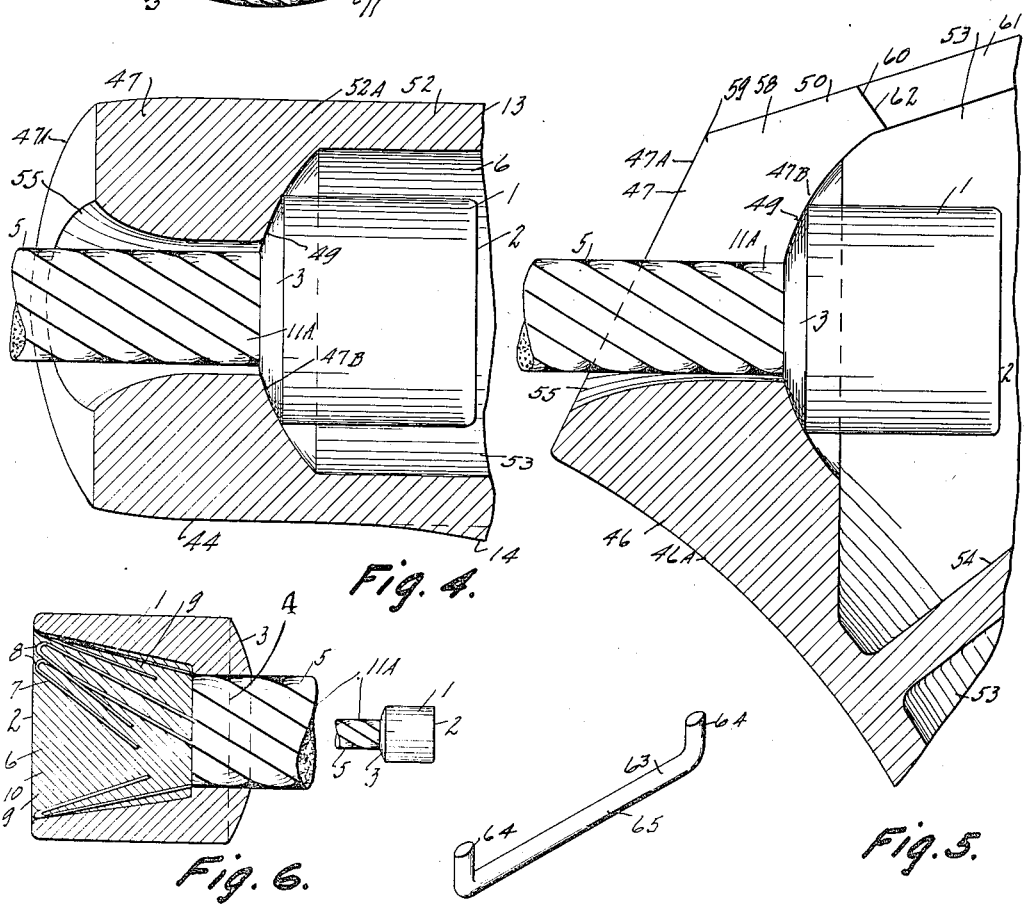

April 2, 1935.  J. W. FORRESTER  1,996,509
LOGGING EQUIPMENT HANGING DEVICE
Filed Feb. 17, 1934   2 Sheets-Sheet 2
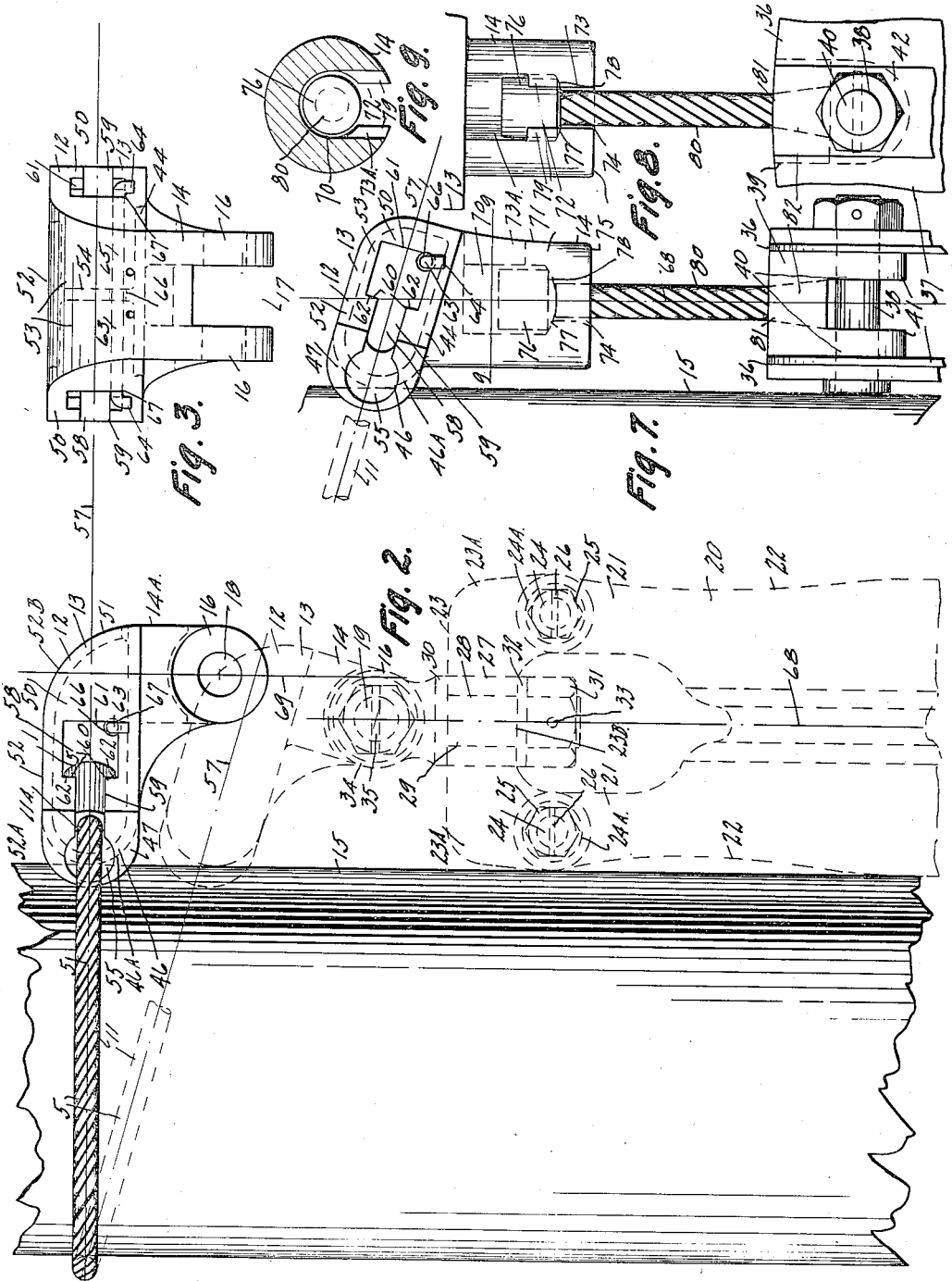

Patented Apr. 2, 1935

1,996,509

UNITED STATES PATENT OFFICE 1,996,509

LOGGING EQUIPMENT HANGING DEVICE

Jesse W. Forrester, Marshfield, Oreg.

Application February 17, 1934, Serial No. 711,813

8 Claims. (Cl. 24—123)

My invention relates to means employed in the hanging of logging blocks, tree jacks, and tree shoes.

The call from year to year has been for more speed in the moving of the huge logs out of the forests on the Pacific coast. The larger and faster donkeys require heavier and more substantial rigging. Tree jacks and tree shoes are now made five feet wide and weigh over one thousand pounds. Some of the high lead blocks stand as high as the average man and weigh two thousand pounds. Many times these huge devices are hung one hundred and seventy-five feet above the ground. A man, known as a high-climber, prepares the spar-tree, usually around five feet in diameter at the butt, by limbing it and topping it at the desired height. The tree is then guyed at its top and intermediate point preparatory to hanging the high lead block, for instance, which is hung at a point where the tree will average twenty-six inches in diameter.

High lead blocks are of two general types one of which may be briefly described as comprising two sides bolted together top and bottom thru spreaders which serve to space the sides apart for the reception of a sheave rotatable on a stationary shaft carried by the sides. The top spreader may be formed with an extension which is provided with an eye or the extension may be separately formed and adapted to swivel in the spreader. In the other general type the top end of each of the sides is provided with spaced ears for the reception of the end of a spreader or bale, better known to the logger as a crosshead, which is secured to them by a pin. In this type the eye is either formed in the crosshead or in the swivel carried by the crosshead.

A clevis is hingedly secured to a block by passing the clevis pin thru the eye in the spreader extension, the swivel, or the crosshead, whichever is incorporated in that particular block. Some loggers prefer to pass the pin beneath the crosshead.

To hang a block, each leg of the clevis is passed thru an eye spliced on each end of a cable sling which is made just long enough to encircle the tree and permit the clevis legs to be passed thru the sling eyes. When this is accomplished the block is hoisted to position where its swivel, for instance, is between the legs of the clevis and its eye in alignment to receive the clevis pin.

The hanging of a block is easier and quicker said than done. The high-climber must do his work while clinging to the side of the spar-tree by means of a belt about his waist and spurs upon his feet or while hanging in a crotch sling. An eight foot 1¾" alloy steel cable sling is a stiff and difficult thing to handle and twist. It must be handled carefully as the jaggers on its spliced ends can rip a man's hand open should the end flip as it is being twisted in working its eye onto a clevis leg. Even when this is accomplished it is a difficult job to get the eye in each clevis leg and the eye in the swivel to align so that the clevis pin, which is usually about three inches in diameter, may be inserted.

Many times it becomes a more difficult job to dismantle a spar-tree for the clevis pin is often frozen because of the great strains placed upon it and the clevis.

One object of my invention is to eliminate much of the hard work of the high-climber.

Another object is to cut down the time required to hang a block or take it down.

Another object is to minimize the danger of injury to the high-climber.

Another object is to eliminate the cost of the fourteen feet of cable required in running the eye splices of the sling—two to four feet additional are also wasted since this amount is required to get sufficient grip upon the individual strands to pull them tight in the splice.

Another object is to cut down the time required to make up a sling after its length has been ascertained by the high-climber.

Another object is to save the cost of labor required to run the splices. Two men are required.

Another object is to avoid the necessity of keeping a splicing specialist on the payroll.

Another object is to permit a sling to be used more than once since the chafing of the sling eye on the clevis generally precludes its being used more than once.

Another object is the avoidance of the insertion and removal of the clevis pin every time a block is hung or taken down.

Still further accomplishments will be apparent as I proceed with the detailed description of my invention.

Thruout the accompanying drawings and in this specification similar numerals refer to similar parts.

Fig. 1 is a plan view partly in section on the median line of the cable; Fig. 2 is a side view; Fig. 3 is a rear view; Fig. 4 is a section on 4—4 of Fig. 1; Fig. 5 is a section on 5—5 of Fig. 2; Fig. 6 is a plan view of a sling with one end enlarged and in section on the median line of the cable; Fig. 7 is an end view showing the interconnection with a thimbled cable connection to a tree jack or tree shoe; Fig. 8 is a side view of Fig. 7; Fig. 9 is a section on 9—9 of Fig. 7; Fig. 10 is a perspective view of the keeper.

Cables with thimbled ends are extensively used in connection with certain types of choker and butt hooks and the method of preparing, cleaning, and anchoring the thimble on the cable is so well known to the logging fraternity that I shall only briefly describe Fig. 6, in the sectional portion of which I have shown only a few of the wires and their anchoring. Most of the thimbles used in connection with choker and butt hooks have flat ends, which I may use, but I prefer to use the type shown in Fig. 6. The thimble 1 is cylindrical in form and has one flat end 2 and one convex end 3 which is pierced by a centrally positioned aperture 4 thru which the end of the cable 5 is passed into the frusto-conically shaped chamber 6 whose base is the end 2. Some loggers merely untwist and spread the wires 7 which form the cable 5 while others prefer to bend the wires 7 back upon themselves as I have shown. The ends of the wires 7 or their bend 8 should be short of the end 2. After the wires have been dipped in sulphuric acid to clean them, and after the surplus acid is cleaned off by clean water, the interstices 9 between them are filled with lead, zinc, or babbitt, poured in while hot so as to form a solid frusto-conically shaped head 10 on the cable 5 in conformity with the chamber 6.

I prepare my sling 11 by securing on each end 11A of a predetermined length of cable 5 a thimble 1. Such a sling is free from the jaggers common with spliced eyes. No matter what strains are in the cable 5 the thimbled ends 11A thereof are readily aligned, without facing up, to their respective associated portion of the interconnection 12 because of their continuous cylindrical form. The interconnection 12 is formed with a head portion 13 with which the sling 11 is associated and a depending leg portion 14 with which the block, tree jack, or tree shoe, to be hung, is associated. As associated with the spar-tree 15, the interconnection 12 has the appearance of an inverted L in Figs. 2 and 7. In Figs. 1, 2, and 3, the leg portion 14 is bifurcated to form the jaws 16 whose opening 17 is disposed at right angles to the head portion 13 and in vertical alignment with the spar-tree 15. The jaws 16 are provided with the holes 18 for the reception of the pin 19 which serves to hingedly secure the interconnection 12 to the block 20. This block 20 is of the type having spaced ears 21 on each of its sides 22. It is shown provided with an inverted U-shaped crosshead 23 with the ends 23A thereof positioned between their associated ears 21 and secured thereto by the pins 24. These pins 24 are constructed similar to the pin 19, that is, they have a head 24A formed integrally on one end thereof and are provided with a nut 25 threaded on the opposite end and secured against further movement, when once adjusted, by a pin 26 which passes thru the nut 25 and the pin 24. The crosshead 23 is formed with an enlarged central portion 27 thru which is passed the pin portion 28 of the swivel 29. The swivel 29 is formed with a top bearing shoulder 30 and is provided with a bottom bearing nut 31 threaded upon the pin portion 28, below a bearing washer 32 positioned below the bottom face 23B of the crosshead 23, and secured, when in adjusted position thereon, by the pin 33 which passes thru the nut 31 and the pin 28. Formed integral with the swivel 29 above its bearing shoulder 30 is the swivel extension 34 adapted to be received between the jaws 16. This extension 34 is provided with an eye 35 thru which is passed the pin 19. It is very desirable in hanging a block to provide the swivel 29 as its use permits a block to hang freely and to readily adjust itself to the lead of a line. The cross-head 23 above described is often built without the enlarged bearing portion 27, that is it is made flat, in which event the jaws 16 straddle the crosshead 23 and the pin 19 is passed thru the eye 35 which is then positioned in the crosshead. I have not deemed it necessary to illustrate the above nor where the eye 35 in the crosshead 23 is eliminated and the pin 19 passed beneath the bottom face 23B of the crosshead 23. When this latter construction is used it is necessary to lengthen the jaws 16 sufficiently. I have not shown the provision of ball or roller bearings which are sometimes provided between the bottom face 23B and the nut 31 in lieu of the washer 32.

While desirable, it is not necessary to use a swivel in connection with a tree jack or tree shoe. In Figs. 7 and 8, I have shown portions of what might be a tree jack or tree shoe and a different means for connecting the interconnection 12 therewith. For the present I shall use these figures, in lieu of additional illustrations, to set forth the usual method of hanging a tree jack or tree shoe. In its simple form a tree jack comprises two stiffened semi-circular plates having a plurality of pins, serving as bottom spreaders, fixed in the sides 36 and positioned therein on the arc of a great circle. Rotatable upon these pins are sheaves which give support to the head spar-tree end of a skyline cable. A tree shoe has a wood lagging in lieu of the sheaves and is used to support the skyline cable at the tail spar-tree. The skyline cable passes over the tree shoe and down to a ground anchorage. It passes over the tree jack and is connected to a set of tackle and by means of them to a ground anchorage. The fall line of the tackle is connected to a drum on the donkey and hence the skyline may be slackened off or tightened up. Since the skyline moves when it is slackened off or tightened up sheaves are used in lieu of the fixed wood lagging. A tree jack or tree shoe 37 is provided with a pin 38, similar in construction to the pins 19 and 24, which passes thru the sides 36 and serves as a hinge pin for the usual clevis (not shown). This clevis may be positioned between the sides 36 or it may be made to straddle them. This clevis is usually associated with the eye sling as described but it may be pointed out that it may be adapted to hinge upon the pin 19 of the interconnection 12. I prefer to use the hinged spreader 39, shown in one form in Figs. 7 and 8, which is provided with the eye 40 thru which the pin 38 passes and upon which the spreader is hinged. For a purpose to be later described, I have shown this spreader 39 bifurcated to form the spaced jaws 41. If the spreader 39 is formed with an extension (not shown) having an eye, in a manner similar to the block spreaders described, the lower portion 42 does not need to be bifurcated. If the spreader is provided with a separately formed extension adapted to swivel it is desirable to bifurcate the portion 42. Without further illustration or comment it may be seen that a tree jack or tree shoe 37 may be hingedly secured to the interconnection 12 similarly to a block. A tree jack or tree shoe is only about one-half the thickness of a block. In Fig. 7, I have shown the head portion 13 shortened in order to position the pin 19 closer to the spar-tree 15. The plan view of the shortened head portion 13 may have the same general appearance as that of the longer head portion whose outline 43 is shown in Fig. 1.

The head portion 13 comprises a base 44 to which the leg portion 14 is fixed. Looking down upon it the interconnection 12 has the appearance of an irregular hexagonal figure symmetrically disposed about the median line 45. The front wall 46 is formed to the curvature of the average spar-tree at the point where a block 20 is to be hung. Its front face 46A is also formed convexly. The outer face 47A of the front side walls 47, which join with the front wall 46, is straight and on a radial line from the center 48 of the spar-tree 15. These side walls 47 are made of sufficient length and thickness to permit the seat 49 for the convex end 3 of the thimble 1 to be adequately formed in their inner face 47B. They are joined to the straight rear side walls 50 which converge to join with the rear wall 51 which is in reality a continuance of the top 52 whose front portion 52A is parallel with the base 44 and whose rear portion 52B is curved downwardly to meet the base 44 in alignment with the rear face 14A of the leg portion 14. Dividing the space enclosed by the above mentioned walls into two symmetrical chambers 53, is the division wall 54 which joins with the top, bottom, front and rear walls.

Each front side wall 47 is pierced by an aperture 55 whose median line 56 is tangent to the center of the sling 11 about the spar-tree 15. This aperture 55 is flared outwardly to the face 47A and is slightly relieved where it merges into the seat 49. On the horizontal median line 57 of the head 13 is cut thru the rear side walls 50 the T-shaped slot 58 whose forward and narrow portion 59 merges with the aperture 55. The forward face 60 of the wide or head portion 61 is positioned approximately midway the thimble 1, when the same is in its seat 49, to form the shoulders 62 which serve to retain the thimble 1 within the chamber 53 against accidental removal. The slot 58 is made so that the cable 5 will pass sidewise thru its narrow portion 59 and the thimble 1 thru the wide portion 61. The face 47B is at right angles to the median line 56. The seat 49 formed in this face is given the same curvature as the convex end 3 but it is made deeper and hence of greater diameter than said convex end 3 which permits the thimble 1 to adjust itself to the lead of the sling ends 11A and maintain its maximum bearing area.

I may hoist the block 20 with the interconnection 12 secured thereto and with one end of the sling 11 in its place within its respective chamber 53. As a safety measure against its accidental removal, especially when there is no strain on the sling 11, I have provided the keeper 63 which comprises an elongated bar having its ends 64 bent at right angles to its body portion 65 which is slidable thru a hole 66 so positioned in the division wall 54 that said body portion 65 may lie adjacent the corner 67 of the slot 58 and be supported thereby. Since the ends 64 are closely adjacent the face 50A of the rear side walls 50 they must be turned counter-clockwise in order to position them so that the keeper 63 may be moved sidewise, as shown in Fig. 1 to permit a thimble 1 to be entered or removed from its chamber 53. The keeper 63 has one of its ends bent after the body portion 65 is positioned in the hole 66 thereby preventing the keeper 63 from being removed. When the assembly has been hoisted and the front face 46A of the interconnection 12 rests against the spar-tree 15 and its median line 57 is at right angles thereto, the free end of the sling 11 may be brought around the spar-tree and its thimbled end 11A moved sidewise thru the slot 58 into its chamber 53 without short-bending it, for the center of the sling 11 may lie in the same plane as the median line 57. In the above position the shortest sling 11 may be used, but since the shoulders 62 must be passed in entering the thimble 1 in its chamber 53, and since these shoulders 62 are to the rear of the thimble seat 49, it follows that there will be some slack in the sling 11 to be taken up. This slack is taken up by lowering the block 20 to the position indicated by the dotted lines in Fig. 2. In this lowered position the center of the pin 19 falls on the median line 68 of the block 20 when it is at rest. Since this median line 68 is forward of the median line 69 of the interconnection 12 in its raised position, and since the convex face 46A of the interconnection 12 rests against the spar-tree in both positions, it follows that the interconenction 12 will be tilted upwardly in the lower position and the sling 11 will be inclined. When in the lower position the center of the sling ends 11A should be in alignment with the median line 57, in which event the cable ends 11A may leave the interconnection 12 without short-bending them. In order to position the interconnection 12 as described for the raised position the upper end of the block 20 must be moved outwardly or inclined outwardly as it is hoisted.

I have shown and described the entering of the sling ends 11A thru the side walls of the interconnection 12. The entering of the sling ends thru the side walls instead of thru the top 52 permits a better distribution of the metal at the point of greatest stress, which is opposite the slot 58, without enlarging the structure. This point of greatest stress is adjacent the spar-tree 15 and is given support thereby. It is to be noted that the faces 47A and 47B diverge as they approach the point of maximum stress.

I have pointed out some of the different constructions met with in logging apparatus and how readily my interconnection 12 may be adapted to them. I may link my interconnection 12 with the crosshead of a block or to a tree shoe or tree jack in still another way which I have illustrated in Figs. 7, 8, and 9. I have formed the leg portion 14 with a central cored chamber 70 thru which the median line 68 passes in alignment therewith. The rear face 71 is provided with the slot 72 opening into the chamber 70. Its lower or narrow portion 73 merges with the centrally positioned aperture 74 in the lower face 75. Its upper or wider portion 73A terminates midway the thimble 76, when its convex end 77 is seated against the inner face 78 formed in accordance therewith, to form the shoulders 79 which prevent the accidental removal of the thimble 76 from the chamber 70. The aperture 74 is flared outwardly toward the lower face 75. The thimble 76 is connected to the short length of cable 80, whose other end 81 is connected to the spreader 39 in a like manner, by the method described for the securing of the thimble 1 to the cable 5. My object in bifurcating the lower portion 42 of the spreader 39 to form the jaws 41 is to permit ready access to the frusto-conically shaped chamber 82 in which is secured the end 81 of the cable 80 by the method previously described.

Many changes may be made in the design and arrangement of the interconnection 12 in its adaptation to the many designs of blocks, tree jacks, and tree shoes, now on the market, without departing from the basic idea, therefore, I do not limit myself to the designs illustrated and described but extend my invention as far as comes fairly within the scope of the appended claims.

What I claim as new is:

1. The combination, in a device for hanging logging equipment on a spar-tree, of a cable having a thimble on each end thereof, and an inverted L-shaped interconnection having a head portion and a leg portion depending from said portion and formed to provide for a hinged connection between it and the equipment, said head portion having spaced recessed seats, positioned tangentially with respect to the spar-tree, for the engagement of the thimbled cable ends whereby said interconnection and the cable are associated to form a loop to encircle the spar-tree.

2. The combination, in a device for hanging logging equipment on a spar-tree, of a cable having a thimble on each end thereof, and an inverted L-shaped interconnection having a head portion with a face curved concavely to conform approximately to the spar-tree curvature and a leg portion depending from said head portion and formed to provide for a hinged connection between it and the equipment, said head portion having spaced recessed seats, positioned tangentially with respect to the spar-tree, for the engagement of the thimbled cable ends whereby said interconnection and the cable are associated to form a loop to encircle the spar-tree.

3. The combination, in a device for hanging logging equipment on a spar-tree, of a cable having a thimble on each end thereof, and an inverted L-shaped interconnection having a head portion with a convex face curved concavely to conform approximately to the spar-tree curvature and a leg portion depending from said head portion and formed to provide for a hinged connection between it and the equipment, said head portion having spaced recessed seats, positioned tangentially with respect to the spar-tree, for the engagement of the thimbled cable ends whereby said interconnection and the cable are associated to form a loop to encircle the spar-tree.

4. The combination, in a device for hanging logging equipment on a spar-tree, of a cable having a thimble on each end thereof, and an inverted L-shaped interconnection having a head portion and a leg portion depending from said head portion and formed to provide for a hinged connection between it and the equipment, said head portion having spaced recessed seats for the engagement of the thimbled cable ends so positioned as to permit said thimbled ends to be entered therein, without short-bending them, whereby said interconnection and the cable are associated to form a loop to encircle the spar-tree.

5. The combination, in a device for hanging logging equipment on a spar-tree, of a cable having a thimble on each end thereof, and an inverted L-shaped interconnection having a head portion and a leg portion depending from said head portion and formed to provide for a hinged connection between it and the equipment, said head portion having recessed seats spaced apart in diverging relation and so positioned as to permit the thimbled cable ends to be entered in seating engagement therewith, without short-bending them, whereby said interconnection and the cable are associated to form a loop to encircle the spar-tree.

6. The combination, in a device for hanging logging equipment on a spar-tree, of a cable having a thimble on each end thereof, and an inverted L-shaped interconnection having a head with a chambered portion and a leg portion depending from said head and formed to provide for a hinged connection between it and the equipment, said head having oppositely disposed apertures each entering the chambered portion from the side in substantially tangential alignment with its respective side of the spar-tree and each having its inner terminal enlarged to form a seat for the reception of the cable-end of the thimble, and a T-shaped slot, associating with each aperture and having its leg portion merged therewith and its head portion positioned rearwardly of the thimble seat, one of said thimbled cable ends being passed through said slot for engagement with its seat whereby said interconnection and the cable are associated to form a loop to encircle the spar-tree.

7. The combination, in a device for hanging logging equipment on a spar-tree, of a cable having a thimble on each end thereof, and an inverted L-shaped interconnection having a head with a chambered portion and a leg portion depending from said head and formed to provide for a hinged connection between it and the equipment, said head having oppositely disposed apertures each entering the chambered portion from the side in substantially tangential alignment with its respective side of the spar-tree and each having its inner terminal enlarged to form a seat for the reception of the cable-end of the thimble, and a T-shaped slot entering the chamber from the side, associating with each aperture and having its leg portion merged therewith and its head portion positioned rearwardly of the thimble seat, one of said thimbled cable ends being passed thru said slot for engagement with its seat whereby said interconnection and the cable are associated to form a loop to encircle the spar-tree.

8. The combination, in a device for hanging logging equipment on a spar-tree, of a cable having a thimble on each end thereof, and an inverted L-shaped interconnection having a chambered head portion with seats therein for the reception of the cable end of each thimble, a T-shaped aperture communicating with each seat, with its head positioned rearwardly thereof, and providing an entrance to the chambered portion for the thimbled cable end to engage its seat, and a keeper slidably secured in the chambered head portion, and normally having lower and rear support from the head of each T-shaped aperture, adapted to be moved endwise to permit either of the thimbled cable ends to be entered or removed from the chambered head.

JESSE W. FORRESTER.